(12) United States Patent
Wu et al.

(10) Patent No.: US 12,481,660 B2
(45) Date of Patent: Nov. 25, 2025

(54) SYSTEMS AND METHODS FOR ENTITY RESOLUTION

(71) Applicant: Capital One Services, LLC, McLean, VA (US)

(72) Inventors: Junqing Wu, Vienna, VA (US); Jeffrey Gabler, McLean, VA (US); Benjamin Cook, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 59 days.

(21) Appl. No.: 18/341,706

(22) Filed: Jun. 26, 2023

(65) Prior Publication Data

US 2024/0427775 A1    Dec. 26, 2024

(51) Int. Cl.
| | |
|---|---|
| *G06F 16/20* | (2019.01) |
| *G06F 16/2453* | (2019.01) |
| *G06F 16/2455* | (2019.01) |
| *G06N 3/084* | (2023.01) |

(52) U.S. Cl.
CPC .... *G06F 16/2456* (2019.01); *G06F 16/24537* (2019.01); *G06F 16/24544* (2019.01); *G06N 3/084* (2013.01)

(58) Field of Classification Search
None
See application file for complete search history.

(56) References Cited

U.S. PATENT DOCUMENTS

| | | | | |
|---|---|---|---|---|
| 8,521,758 | B2* | 8/2013 | Nachnani | G06F 16/215 |
| | | | | 707/769 |
| 9,576,248 | B2* | 2/2017 | Hurwitz | G06F 16/215 |
| 10,558,627 | B2* | 2/2020 | Cassidy | G06F 16/24556 |
| 2014/0046697 | A1* | 2/2014 | Rogers | G16H 10/60 |
| | | | | 705/3 |
| 2019/0303371 | A1* | 10/2019 | Rowe | G06F 16/24564 |
| 2020/0356816 | A1 | 11/2020 | Blalock et al. | |
| 2020/0394511 | A1* | 12/2020 | Kasai | G06N 3/044 |
| 2021/0279604 | A1 | 9/2021 | Seth et al. | |

(Continued)

OTHER PUBLICATIONS

International Search Report and Written Opinion on PCT Appl. Ser. No. PCT/US2024/034870 Dated Oct. 14, 2024 (11 pages).

(Continued)

*Primary Examiner* — Belix M Ortiz Ditren
(74) *Attorney, Agent, or Firm* — Foley & Lardner LLP

(57) ABSTRACT

Systems and methods for performing entity resolution. In some aspects, the system obtains a plurality of attributes represented in a plurality of records from one or more sources. The system generates a plurality of match vectors based on the plurality of attributes. Each match vector includes a set of attributes that match between a pair of records and a remaining set of attributes that are not required to match between the pair of records. The system processes the plurality of match vectors using an entity resolution model trained to output a binary indicator regarding whether one or more pairs of records for a match vector be merged. The system merges the one or more pairs of records for each match vector of the plurality of match vectors having a corresponding binary indicator output from the entity resolution model that pairs of records for the match vector be merged.

20 Claims, 11 Drawing Sheets

(56) References Cited

U.S. PATENT DOCUMENTS

2022/0100720 A1* 3/2022 Dhama ............... G06F 18/2323
2023/0244697 A1* 8/2023 Biswas ................ G06F 16/215
　　　　　　　　　　　　　　　　　　　　　　707/722

OTHER PUBLICATIONS

Peter Christen, "A two-step classification approach to unsupervised record linkage," In: AusDM'07: Proceedings of the sixth Australasian conference on Data mining and analytics—vol. 70, Dec. 3, 2007.

Yuchao Tao, "Answering and Explaining SQL Queries Privately," the degree of Doctor of Philosophy in the Department of Computer Science Duke University, 2022 (170 pages).

* cited by examiner

| First Name | Last Name | Zip | DoB | TIN | Phone | Target Match | Target Non-Match |
|---|---|---|---|---|---|---|---|
| M | M | U | U | M | U | 3518 | 1806 |
| U | M | U | M | M | U | 78,410 | 34,922 |
| M | M | U | U | U | U | 39,807 | 8,329,756 |
| M | U | M | U | M | U | 389,515 | 178,820 |
| U | M | U | M | U | U | 46,751 | 5,503,229 |
| U | M | M | U | M | M | 252 | 42 |
| U | M | M | M | U | M | 9572 | 980 |
| ⋮ | ⋮ | ⋮ | ⋮ | ⋮ | ⋮ | ⋮ | ⋮ |
| M | M | M | U | M | M | 20,132 | 665 |

| First Name | Last Name | Zip | DoB | TIN | Phone | Record Pairs |
|---|---|---|---|---|---|---|
| M | M | U | U | M | U | 3518 |
| U | M | U | M | M | U | 78,410 |
| M | M | U | U | U | U | 39,807 |
| M | U | M | U | M | U | 389,515 |
| U | M | U | M | U | U | 46,751 |
| U | M | M | M | M | U | 252 |
| U | M | U | M | U | M | 9572 |
| ... | ... | ... | ... | ... | ... | ... |
| M | M | M | U | M | M | 20,132 |

| First Name | Last Name | Zip | DoB | TIN | Phone | LLR |
|---|---|---|---|---|---|---|
| M | M | U | U | M | U | 0.9534 |
| U | M | U | M | M | U | 0.7359 |
| M | M | U | U | U | U | 0.8586 |
| M | U | M | U | M | U | 0.4312 |
| U | M | U | M | U | U | 0.1211 |
| U | M | M | U | M | U | 0.3654 |
| U | M | M | M | U | M | 0.7176 |
| ⋮ | ⋮ | ⋮ | ⋮ | ⋮ | ⋮ | ⋮ |

| First Name | Last Name | Zip | DoB | TIN | Phone | Decision |
|---|---|---|---|---|---|---|
| M | M | U | U | M | U | M |
| U | M | U | M | M | U | M |
| M | M | U | U | U | U | U |
| M | U | M | M | M | U | M |
| U | U | U | M | U | U | U |
| U | M | U | U | M | U | U |
| U | M | M | M | U | M | M |
| M | M | M | U | M | M | M |

```
-- Comparison function for a single attribute
-- This computes a Trinary L2 Feature from the corresponding L1 Feature Values
CREATE FUNCTION Trinary_Comparison(
   L1_Feature_A as VARCHAR, L1_|Feature_B as VARCHAR
) RETURNS CHAR AS CASE
   WHEN Feature_A IS NULL OR Feature_B IS NULL THEN '_'
   ELSE WHEN Feature_A == Feature_B then 'M'
   ELSE 'U'
END;
```

```
-- Group By Blocking Keys and create Match Vector (sequence of L2 Feature Values)
SELECT
    A.Row_Id AS A_Row_ID,
    B.Row_Id AS B_Row_ID,
    CONCAT(
       Trinary_Comparison(A.First_Name, B.First_Name),
       Trinary_Comparison(A.Last_Name, B.Last_Name),
       ...,
       Trinary_Comparison(A.Mobile_Phone, B.Mobile_Phone)
    ) AS Match_Vector INTO Record_Pairs_For_Blocking_Key_1

FROM Records as A INNER JOIN Records as B
    on (
       A.DoB = B.DoB
       and A.Postal_Code = B.Postal_Code and A.Row_Id < B.Row_Id
    );
```

```
-- Join Match Vectors against provided list of Model Match values.
INSERT INTO Model_Match SELECT A_Row_Id, B_Row_Id FROM Records_Pairs_For_Blocking_Key_1 as Pairs INNER JOIN Match_Vector_List_From_Text_File_1 as Match_Codes
   on Pairs.Match_Vector = Match_Codes.Match_Vector;
```

*FIG. 10*

SYSTEMS AND METHODS FOR ENTITY RESOLUTION

SUMMARY

Entity resolution, also known as record linkage or deduplication, is the process of identifying and merging records or data points that refer to the same real-world entity or individual. In other words, it is the process of identifying and linking together multiple records that refer to the same person, company, organization, or other entity. Entity resolution is particularly important in situations where data is collected from multiple sources or systems, as it can help to eliminate duplicates and inconsistencies in the data and create a more accurate and comprehensive picture of the entities in question. It is used in a variety of fields, including healthcare, finance, marketing, and law enforcement, among others.

The entity resolution process is a complex computational problem that involves identifying and merging records or data points that refer to the same real-world entity. At its core, the technical problem involves comparing pairs of records and determining whether they refer to the same entity or not. This comparison is typically based on some form of similarity measure, such as string matching or feature-based comparison, and involves evaluating various attributes or fields of the records. The technical nature of the entity resolution problem is further complicated by a number of factors, including large-scale datasets, messy data, heterogeneous data sources, and privacy concerns related to unauthorized access.

Further, an n-squared computational complexity arises when trying to match or compare every possible pair of records in a dataset. When dealing with a large dataset, the number of possible record pairs can grow very quickly, leading to a significant increase in computation time and resource requirements. For example, if a dataset has n records, the total number of possible record pairs is n*(n−1)/2, which is a quadratic function of n. This can be problematic for entity resolution algorithms, as they often rely on comparing records using various similarity metrics or rules, and the number of comparisons required can quickly become unmanageable as the dataset grows in size.

Conventional systems sometimes use a blocking key approach that involves grouping similar records together based on a specific attribute or key, known as the blocking key. The basic idea behind the blocking key approach is to divide the dataset into smaller, more manageable subsets or blocks, based on the values of the blocking key. Records within the same block are then compared against each other to determine if they refer to the same entity. For example, consider a dataset of customer records that includes attributes such as name, address, and phone number. To use the blocking key approach, the system may choose the postal code as the blocking key and group all records with the same postal code together in a block. The system may then compare the records within each block to identify potential matches. However, the blocking key approach may not always be effective, particularly if the blocking key does not provide a sufficiently fine-grained partitioning of the data. In some cases, multiple blocking keys may need to be used, or additional preprocessing steps may be required to improve the accuracy of the entity resolution results. Searching for suitable blocking key(s) is difficult because there are a large number of potential keys to consider. If the cardinality is too large (i.e., fine-grained), then many matches may be missed. If the cardinality is too small (i.e., coarse-grained), then computational scaling may not be sufficiently reduced. This is because blocking still scales as n-squared, only n as the size of the blocks (e.g., number of records sharing a single postal code).

In some aspects, to address one or more of the technical problems described above, systems and methods are described herein for performing entity resolution for a plurality of records independent of any blocking key. In one example, the system uses Boolean match vectors constructed from exact-match conditions on each of k<~20 record attributes, for which it is possible to count the occurrences of each discrete match vector out of the total N=n (n−1)/2 possible record pairs (where n is the number of records in the dataset). While N is too large to directly enumerate on practical datasets, the set of match vectors is enumerable (either $2^k$, or, if we recognize missing data as a separate case, $3^k$), and the occurrence count can be computed exactly and efficiently through a series of self-join and group-by-count operations expressible in standard structured query language (SQL). This count enables the construction of an entity resolution model which does not depend on a particular choice of blocking key, retrieving 100% of the record pairs satisfying its decision rule. This could be a supervised entity resolution model that avoids any a priori choice of blocking key, or an unsupervised model obtained by fitting the observed counts to a binary mixture of multinomial distributions. Alternatively, the match vector counts can be used to augment a traditional model by identifying the record pairs that the model has missed due to its selection of blocking keys and identifying the blocking keys necessary to retrieve them.

In some embodiments, the system obtains a plurality of records from one or more sources. The system determines a plurality of attributes represented in the plurality of records. The system generates a plurality of match vectors based on the plurality of attributes. Each match vector includes a set of attributes that match between a pair of records and a remaining set of attributes that are not required to match between the pair of records. The system obtains training data for a subset of pairs of records randomly selected from across the plurality of match vectors. The training data indicates for each pair of records in the subset whether the pair of records be merged. The system trains an entity resolution model based on the training data, the subset of pairs of records, and the plurality of match vectors. The entity resolution model is trained to output a binary indicator regarding whether pairs of records for a match vector be merged. The system merges pairs of records for each match vector of the plurality of match vectors having a corresponding binary indicator output from the entity resolution model that pairs of records for the match vector be merged.

Various other aspects, features, and advantages of the disclosure will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows an exemplary table for illustrating a process for performing entity resolution for a plurality of records, in accordance with one or more embodiments.

FIG. 5 shows another exemplary table for illustrating a process for performing entity resolution for a plurality of records, in accordance with one or more embodiments.

FIG. 6 shows yet another exemplary table for illustrating a process for performing entity resolution for a plurality of records, in accordance with one or more embodiments.

FIG. 8 shows yet another exemplary table for illustrating a process for performing entity resolution for a plurality of records, in accordance with one or more embodiments.

FIG. 10 shows illustrative SQL queries for performing entity resolution for a plurality of records, in accordance with one or more embodiments.

DETAILED DESCRIPTION

In the following description, for the purposes of explanation, numerous specific details are set forth in order to provide a thorough understanding of the embodiments of the systems and methods described herein. It will be appreciated, however, by those having skill in the art, that the embodiments may be practiced without these specific details or with an equivalent arrangement. In other cases, well-known structures and devices are shown in block diagram form in order to avoid unnecessarily obscuring the embodiments.

Figure 1:
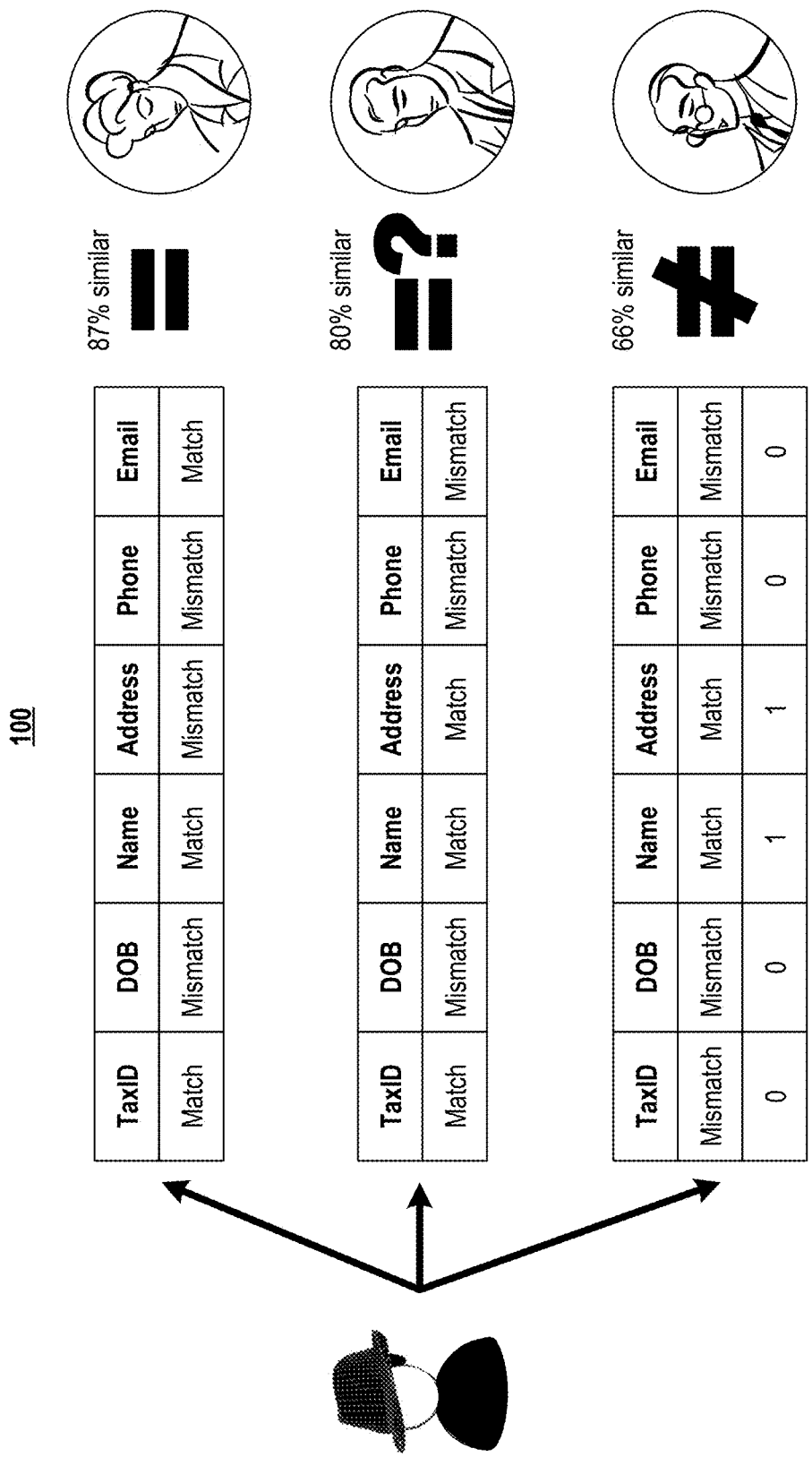
FIG. 1 shows an illustrative example for performing entity resolution for a plurality of records, in accordance with one or more embodiments.

FIG. 1 shows an illustrative example 100 for performing entity resolution for a plurality of records. In some embodiments, systems for performing entity resolution seek to answer the question whether the two customers shown in FIG. 1 should be considered the same person for a particular process. For example, an exemplary non-limiting list of processes may include servicing, marketing, fraud investigation, and anti-money laundering. In particular, the technical nature of this entity resolution problem can be presented as what is the minimally required information to uniquely identify a person/customer, the likely match outcome, and confidence regarding matches found.

Conventional systems employ blocking keys to address the quadratic scaling issue. There are published methods that are unsupervised (i.e., no labeled training data), and many methods have an adjustable threshold that can provide finer or coarser grouping. Few published methods address the choice of blocking keys. In the standard approach, blocking keys determine the data that is available to train the supervised classification model. This means that a) any matching records that don't satisfy the blocking keys will never make it to the model, so will be false negatives, b) these false negatives are "blind" because one would not even know how many there are, and c) iterative development is difficult because every time you the blocking keys change the model must be re-trained on the new dataset. The described systems and methods address the challenges not addressed by existing solutions, including the compromises around a particular choice of blocking keys.

The described systems and methods address further challenges, including the n-squared problem, lack of ground truth (labels) once moving away from the existing grouping, and need for flexible/adjustable level of confidence in the match outcome. With respect to the n-squared problem, as discussed above, this can be problematic for entity resolution algorithms, as they often rely on comparing records using various similarity metrics or rules, and the number of comparisons required can quickly become unmanageable as the dataset grows in size. The lack of ground truth labels can be a significant challenge in entity resolution, particularly when moving away from existing groupings or datasets. Ground truth labels are a set of pre-defined, accurate labels that identify which records truly refer to the same entity. Further, having a flexible or adjustable level of confidence in the match outcome of the entity resolution process can be helpful in many cases. This is because entity resolution is often an iterative and interactive process, where the accuracy of the results may depend on a number of different factors, such as the quality of the data, the similarity measure used, and the specific use case. By allowing users to adjust the level of confidence in the match outcome, entity resolution algorithms can provide greater flexibility and control over the process. For example, if the algorithm is overly conservative in its matching decisions, it may miss some valid matches, while if it is too aggressive, it may introduce false positives. This can be particularly useful in applications where the consequences of false matches or missed matches can be significant, such as in healthcare or finance.

To address the above-described technical challenges, the described systems and methods present a highly adaptable unified model, scratch-made by constructing, from the bottom up, each of the three pillars of unsupervised machine learning, including (a) a dataset consisting of the counts of each match vector, (b) a cost function to optimize (e.g. mixture model Bayesian likelihood), and (c) an optimization algorithm (e.g. expectation maximization). In some aspects, systems and methods are described herein for performing entity resolution for a plurality of records. The system obtains a plurality of records from one or more sources. The system determines a plurality of attributes represented in the plurality of records. The system generates a plurality of match vectors based on the plurality of attributes. Each match vector includes a set of attributes that match between a pair of records and a remaining set of attributes that are not required to match between the pair of records. The system obtains training data for a subset of pairs of records randomly selected from across the plurality of match vectors. The training data indicates for each pair of records in the subset whether the pair of records be merged. The system trains an entity resolution model based on the training data, the subset of pairs of records, and the plurality of match vectors. The entity resolution model is trained to output a binary indicator regarding whether pairs of records for a match vector be merged. The system merges pairs of records for each match vector of the plurality of match vectors having a corresponding binary indicator output from the entity resolution model that pairs of records for the match vector be merged.

In some embodiments, the unsupervised mixture model may be expressed as three components including a) the dataset of observations obtained from match vector counting, b) the generative model hypothesizing different single-attribute match probabilities depending on whether the records are a true match or not, and c) the EM-like optimization algorithm that finds the match probabilities that best explain the observations, such as maximizing Bayesian likelihood. In some embodiments, there are two other possible ways to use the innovation. First, if we have a trusted grouping from some black-box model or external source whose behavior we wish to replicate, we could add that as an additional variable to the pair-counting operation. That would allow us to know, for each discrete feature vector, the number of pairs that were and were not matched by the black-box model. Second, we could send those pairs corresponding to a subset of discrete match vectors to a standard supervised classification algorithm. This would be similar to the blocking key approach, however the pair counting allows this to be done with "no regrets" about match vectors not included.

Figure 2:
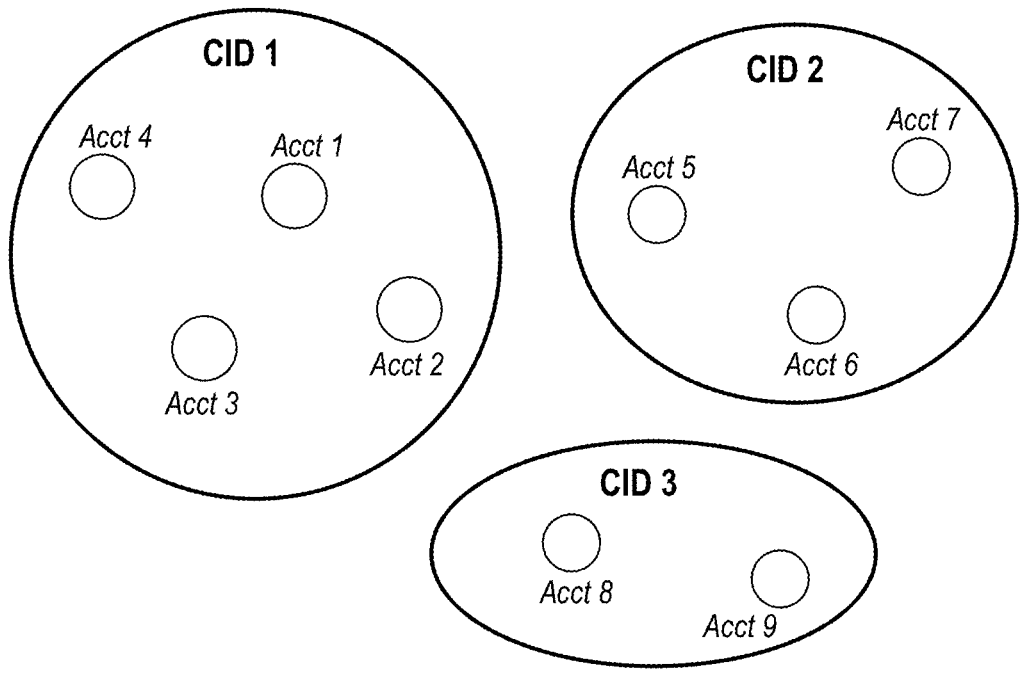
FIG. 2 shows another illustrative example for performing entity resolution for a plurality of records, in accordance with one or more embodiments.
Figure 3:
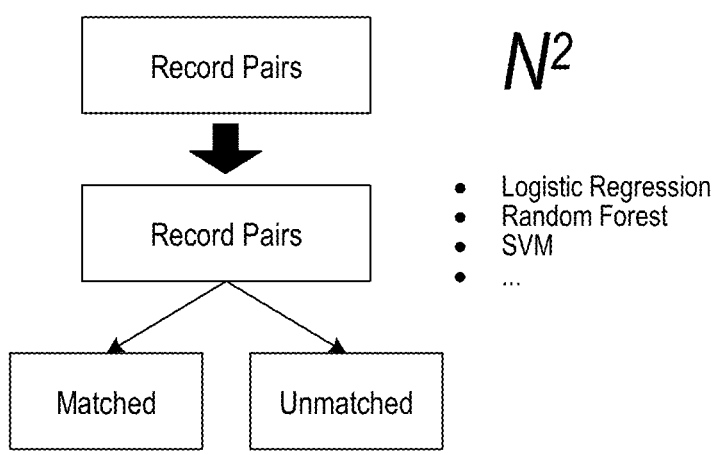
FIG. 3 shows an illustrative process for performing entity resolution for a plurality of records, in accordance with one or more embodiments.

Today's customer databases are typically indexed by account, not by person. For example, a multi-account customer may have one demographic record per account. While these records are typically similar, they are not identical. A customer identifier (abbreviated here as CID) may be a key assigned to each record. In this example, records with the same key are considered the same person. For example, FIG. 2 shows an illustrative example 200 for exemplary CIDs and corresponding accounts. The conventional approach to entity resolution, as illustrated by process 300 in FIG. 3, may record pairs generated by blocking key under exact match conditions. Entity resolution is typically a two-stage process: first one selects one or more blocking keys, which are used to perform a self-join on the dataset, and then match vectors are computed for each resulting record pair. Match vectors measure the degree of similarity of several record attributes for a given pair and are used to classify each pair as matching or not. Record pairs that did not match on a blocking key will never be visited, which results in missing record pairs that could have matched.

The blocking key approach is a commonly used technique in entity resolution that involves grouping similar records together based on a specific attribute or key. The basic idea behind the blocking key approach is to divide the dataset into smaller, more manageable subsets or blocks, based on the values of the blocking key. Records within the same block are then compared against each other to determine if they refer to the same entity. For example, the record pairs may be generated by social security number (SSN) and therefore must match on the SSN. For each group by SSN, pairs are collected within the group. This requires a complexity of O (n-squared) where n is the number of records sharing an SSN. In this approach, the blocking key is a pre-condition for a match. As such, decision-making occurs in two places, and this adds complexity to model development. This approach may be generally suitable when requiring a strict blocking key fits with business intent. However, for tolerant matching situations when high recall is required, the blocking key approach poses significant challenges, including completeness requiring multiple blocking keys (e.g., a customer might fail to match on any single feature), hard to optimize blocking keys (e.g., not aware of what is missing), re-fitting model every time blocking keys change, and multiple and/or tolerant blocking keys requiring greatly increased compute (e.g., poor choice of blocking key can make the problem incomputable). In other words, the blocking key approach may not always be effective, particularly if the blocking key does not provide a sufficiently fine-grained partitioning of the data. In some cases, multiple blocking keys may need to be used, or additional preprocessing steps may be required to improve the accuracy of the entity resolution results.

Instead, the proposed system and methods make the blocking key do most (if not all) of the work. This novel discrete model approach starts by grouping record pairs that match on the same set of attributes (regardless of the specific value for each attribute). Each distinct set of matching/non-matching attributes is referred to as a "match vector" and can be thought of as a vector of discrete model features. Within each match vector group, some fraction of the individual record pairs will be positively classified (matching, or indicating belonging to the same entity) or negatively classified (non-matching, or indicating not belonging to the same entity). The fraction is determined by either a prior target (such as an externally sourced identifier one may want to emulate) for a supervised model or an inferred Bayesian prior informed by the historic background data (such as proportion of overall matches) supplemented by a relatively small number of manual labels for a semi-supervised approach.

Under the supervised approach, the system first generates a table such as table 400 shown in FIG. 4. This table provides a Record Pair Summary. The last two columns are computed using a prior target. From here, the system can fit a classification model (e.g., decision tree, XGBoost etc.) to determine the match/non-match decision for each match vector.

Under the semi-supervised approach, the system first generates the record pair summary for all the match vectors, such as table 500 shown in FIG. 5. Then the system processes the question for each match vector: "Are the record pairs matching on the attributes represented by the match vector more likely from the same customer or different customers?" That forms the basis of the Bayesian prior, which comes in the form of a "Mixture Model":

$$P(\text{Match Vector}) = k \times P(\text{Class } A) + (1-k) \times P(\text{Class } B),$$
where:

k=Mixing Ratio; usually heuristically informed by the background match rate
Two possible classes for each record pair (also match vector):
    Class A (not the same customer)
    Class B (the same customer)
Feature match probabilities are class parameters
    Class A: low probability
    Class B: high probability
    Maximum Likelihood estimation for parameters (Expectation Maximization (EM) method)
Naive Bayes for class PDF (Probability Distribution Function)
    Features are independent With the above structure in place, the system can now compute the parameters for the Bayesian prior using an iterative technique called Expectation Maximization, which will result in a fitted LLR for each match vector (e.g., as shown in table 600 in FIG. 6).

Figure 7:
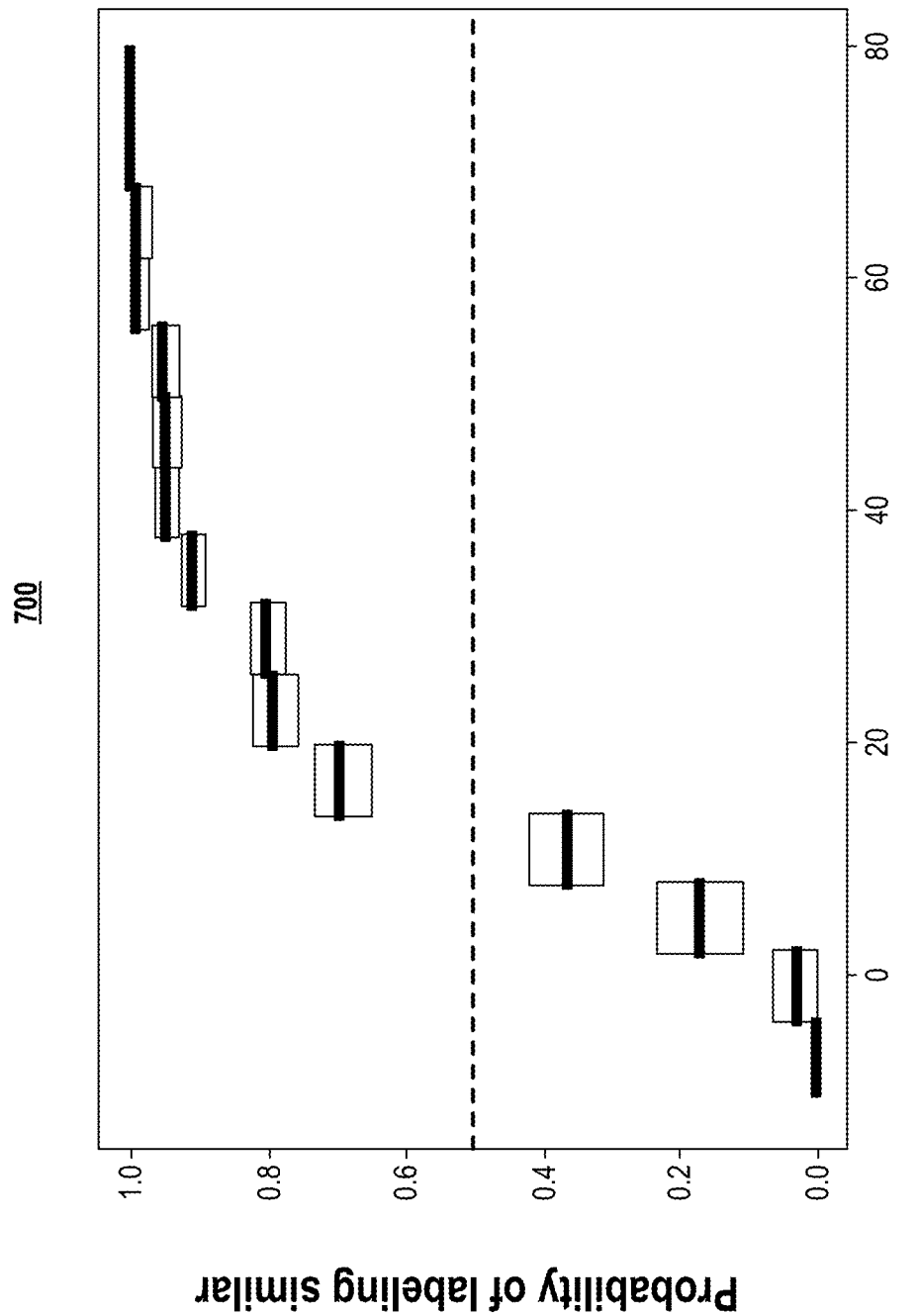
FIG. 7 shows an exemplary graph for illustrating a process for performing entity resolution for a plurality of records, in accordance with one or more embodiments.

At this point, the system obtains manually reviewed labels for a randomly selected set of record pairs across match vectors to determine where to draw the line between the "similar" class and the "dissimilar" class (e.g., as shown in graph 700 in FIG. 7). Please note that the probabilities for the vertical axis are fitted probabilities using logistic regression to the "0"s and "1"s (manual labels). With a probability threshold of 0.5 (red line in the plot), the system can identify a corresponding LLR threshold to determine if the record pairs in any given match vector belong to the "similar" class or not, which results in the decision table (e.g., as shown in table 800 in FIG. 8). The decision table illustrates the decisions for a selected subset of match vectors.

Figure 9:
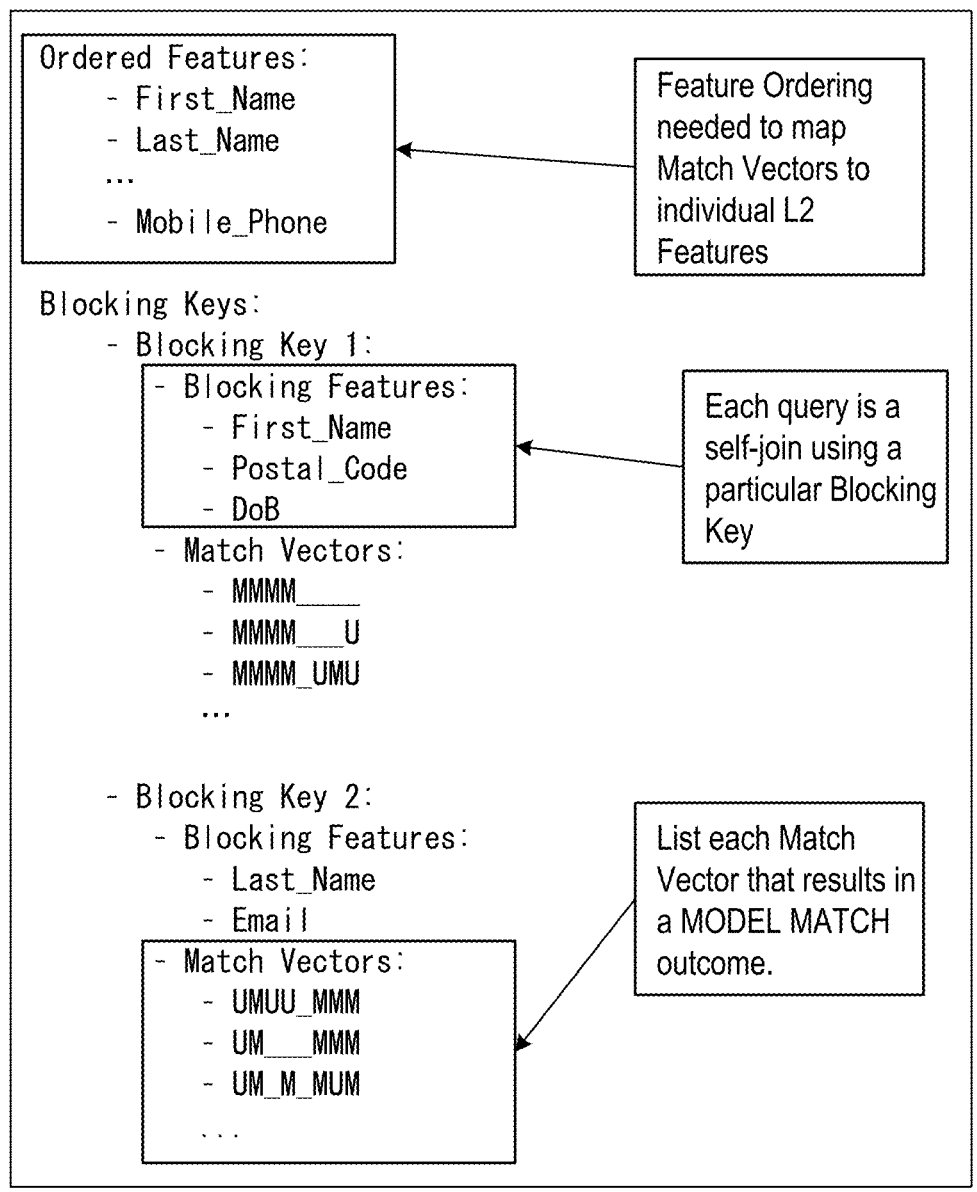
FIG. 9 shows an illustrative YAML file for performing entity resolution for a plurality of records, in accordance with one or more embodiments.

In some embodiments, the rows for the entire decision table can be consolidated into any simple data storage format and packaged into a text file, a CSV file, a JSON file, an XML file, or a YAML file, such as file 900 shown in FIG. 9. YAML is a human-readable data-serialization language. It is commonly used for configuration files and in applications where data is being stored or transmitted. Using the YAML file, the system generates SQL queries (e.g., as shown in file 1000 in FIG. 10), to generate all the record pairs which we can then use to create a graph using a connected components algorithm. SQL is a domain-specific language used in programming and designed for managing data held in a relational database management system or for stream processing in a relational data stream management system. It is particularly useful in handling structured data (e.g., data incorporating relations among entities and variables). The result of this SQL query is a list of matching pairs. This would be suitable to send to the connected components algorithm for producing final entity groups.

Figure 11:
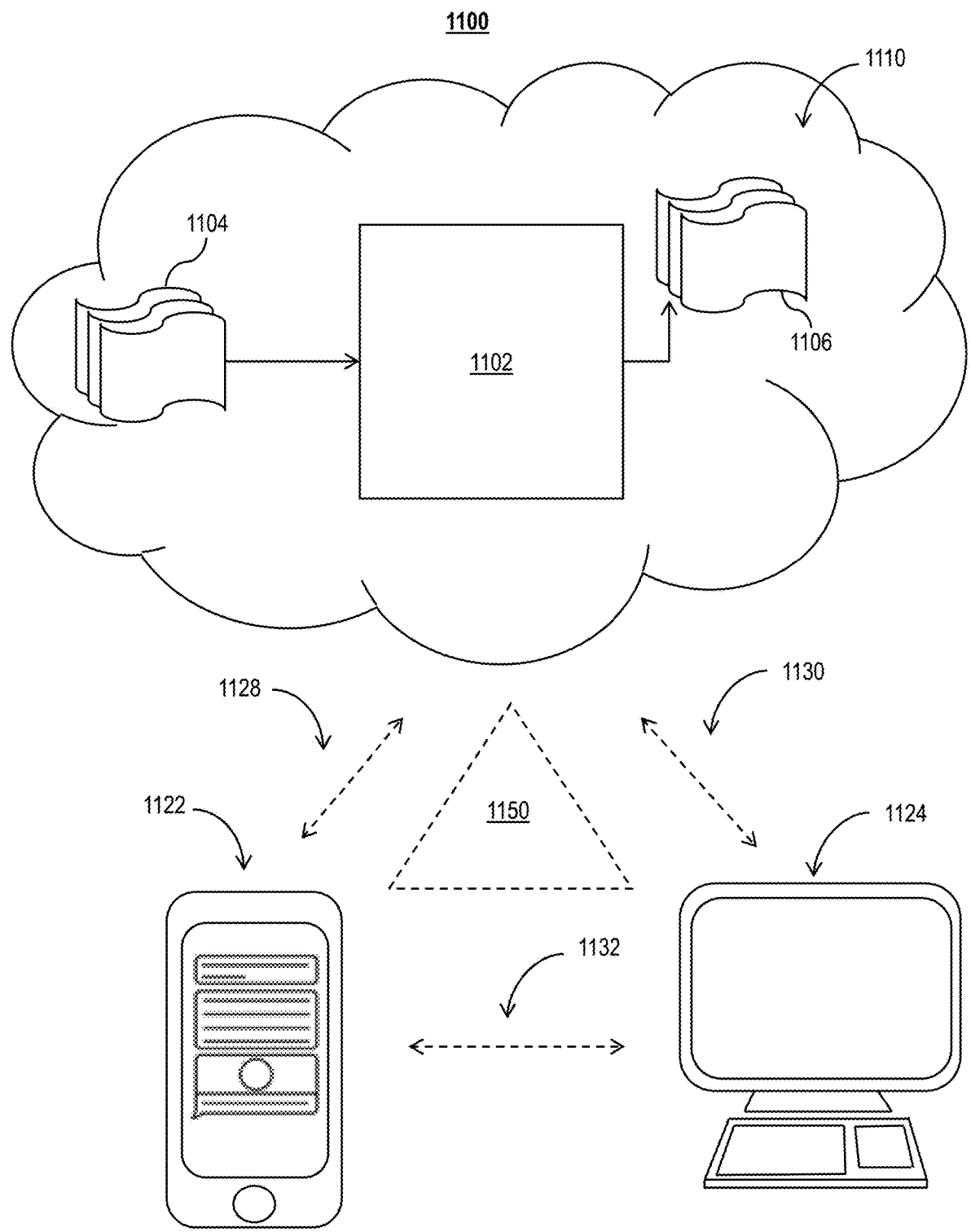
FIG. 11 is an illustrative architecture for a system for facilitating performing entity resolution for a plurality of records, in accordance with one or more embodiments.

FIG. 11 is an illustrative architecture for system 1100 for facilitating performing entity resolution for a plurality of records, in accordance with one or more embodiments. As shown in FIG. 11, system 1100 may include mobile device 1122 and user terminal 1124 (either type of device may be a "user device" as referred to herein, though a user device may additionally or alternatively include other types of devices as well). While shown as a smartphone and a personal computer, respectively, in FIG. 11, it should be noted that mobile device 1122 and user terminal 1124 may be any computing device, including, but not limited to, a laptop computer, a tablet computer, a hand-held computer, or other computer equipment (e.g., a server), including "smart," wireless, wearable, and/or mobile devices. FIG. 11 also includes cloud components 1110. Cloud components 1110 may alternatively be any computing device as described above and may include any type of mobile terminal, fixed terminal, or other device. For example, cloud components 1110 may be implemented as a cloud computing system and may feature one or more component devices. It should also be noted that system 1100 is not limited to three devices. Users may, for instance, utilize one or more devices to interact with one another, one or more servers, or other components of system 1100. It should be noted that, while one or more operations are described herein as being performed by particular components of system 1100, those operations may, in some embodiments, be performed by other components of system 1100. As an example, while one or more operations are described herein as being performed by components of mobile device 1122, those operations may, in some embodiments, be performed by components of cloud components 1110. In some embodiments, the various computers and systems described herein may include one or more computing devices that are programmed to perform the described functions. Additionally, or alternatively, multiple users may interact with system 1100 and/or one or more components of system 1100. For example, in one embodiment, a first user and a second user may interact with system 1100 using two different components.

With respect to the components of mobile device 1122, user terminal 1124, and cloud components 1110, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 11, both mobile device 1122 and user terminal 1124 include a display upon which to display data (e.g., based on output data received from system 1100).

Additionally, as mobile device 1122 is shown as a touch-screen smartphone, this display also acts as a user input interface. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 1100 may run an application (or another suitable program). The application may cause the processors and/or control circuitry to perform operations related to generating dynamic database query responses using ensemble prediction by correlating probability models with non-homogenous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 11 also includes communication paths 1128, 1130, and 1132. Communication paths 1128, 1130, and 1132 may include the Internet, a mobile phone network, a mobile voice or data network (e.g., a 5G or LTE network), a cable network, a public switched telephone network, or other types of communication networks or combinations of communication networks. Communication paths 1128, 1130, and 1132 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 1110 may include a server 1102 for implementing one or more embodiments described with respect to FIGS. 1-10. For example, server 1102 may implement a portion or all of the functionality described with respect to FIGS. 1-10. Server 1102 may receive input data 1104 from mobile device 1122, execute the operation to process the input data 1104, and transmit output data 1106 to user terminal 1124. Cloud components 1110 may also include control circuitry configured to perform the various operations needed to facilitate performing entity resolution for a plurality of records, according to one or more embodiments.

In some embodiments, cloud components 1110 include an artificial intelligence model. The artificial intelligence model may take inputs and provide outputs. The inputs may include multiple datasets, such as a training dataset and a test dataset. In some embodiments, the outputs may be fed back to the artificial intelligence model as input to train the artificial intelligence model (e.g., alone or in conjunction with user indications of the accuracy of the outputs, with labels associated with the inputs, or with other reference feedback information). For example, the system may receive a first labeled feature input, wherein the first labeled feature input is labeled with a known prediction for the first labeled feature input. The system may then train the artificial intelligence model to classify the first labeled feature input with the known prediction.

In another embodiment, the artificial intelligence model may update its configurations (e.g., weights, biases, or other parameters) based on the assessment of its prediction and reference feedback information (e.g., user indication of accuracy, reference labels, or other information). In another embodiment, where the artificial intelligence model is a neural network, connection weights may be adjusted to reconcile differences between the neural network's prediction and the reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the artificial intelligence model may be trained to generate better predictions.

In some embodiments, the artificial intelligence model may include an artificial neural network. In such embodiments, the artificial intelligence model may include an input layer and one or more hidden layers. Each neural unit of the artificial intelligence model may be connected with many other neural units of the artificial intelligence model. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function that the signal must surpass before it propagates to other neural units. The artificial intelligence model may be self-learning and trained, rather than explicitly programmed, and can perform significantly better in certain areas of problem solving as compared to traditional computer programs. During training, an output layer of the artificial intelligence model may correspond to a classification of the artificial intelligence model, and an input known to correspond to that classification may be input into an input layer of the artificial intelligence model during training. During testing, an input without a known classification may be input into the input layer, and a determined classification may be output.

In some embodiments, the artificial intelligence model may include multiple layers (e.g., where a signal path traverses from front layers to back layers). In some embodiments, backpropagation techniques may be utilized by the artificial intelligence model where forward stimulation is used to reset weights on the "front" neural units. In some embodiments, stimulation and inhibition for the artificial intelligence model may be more free flowing, with connections interacting in a more chaotic and complex fashion. During testing, an output layer of the artificial intelligence model may indicate whether or not a given input corresponds to a classification of the artificial intelligence model.

System 1100 also includes application programming interface (API) layer 1150. API layer 1150 may allow the system to communicate across different devices. In some embodiments, API layer 1150 may be implemented on mobile device 1122 or user terminal 1124. Alternatively or additionally, API layer 1150 may reside on one or more of cloud components 1110. API layer 1150 (which may be a REST or Web services API layer) may provide a decoupled interface to data and/or functionality of one or more applications. API layer 1150 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 1150 may use various architectural arrangements. For example, system 1100 may be partially based on API layer 1150, such that there is strong adoption of SOAP and RESTful Web services, using resources like Service Repository and Developer Portal, but with low governance, standardization, and separation of concerns. Alternatively, system 1100 may be fully based on API layer 1150, such that separation of concerns between layers like API layer 1150, services, and applications are in place.

In some embodiments, the system architecture may use a microservice approach. Such systems may use two types of layers: Front-End Layer and Back-End Layer, where microservices reside. In this kind of architecture, the role of the API layer 1150 may provide integration between the Front-End Layer and the Back-End Layer. In such cases, API layer 1150 may use RESTful APIs (exposition to front-end or event communication between microservices). API layer 1150 may use AMQP (e.g., Kafka, RabbitMQ, etc.). API layer 1150 may use incipient usage of new communication protocols such as gRPC, Thrift, etc.

In some embodiments, the system architecture may use an open API approach. In such cases, API layer 1150 may use commercial or open-source API platforms and their modules. API layer 1150 may use a developer portal. API layer 1150 may use strong security constraints applying WAF and DDOS protection, and API layer 1150 may use RESTful APIs as standard for external integration.

Figure 12:
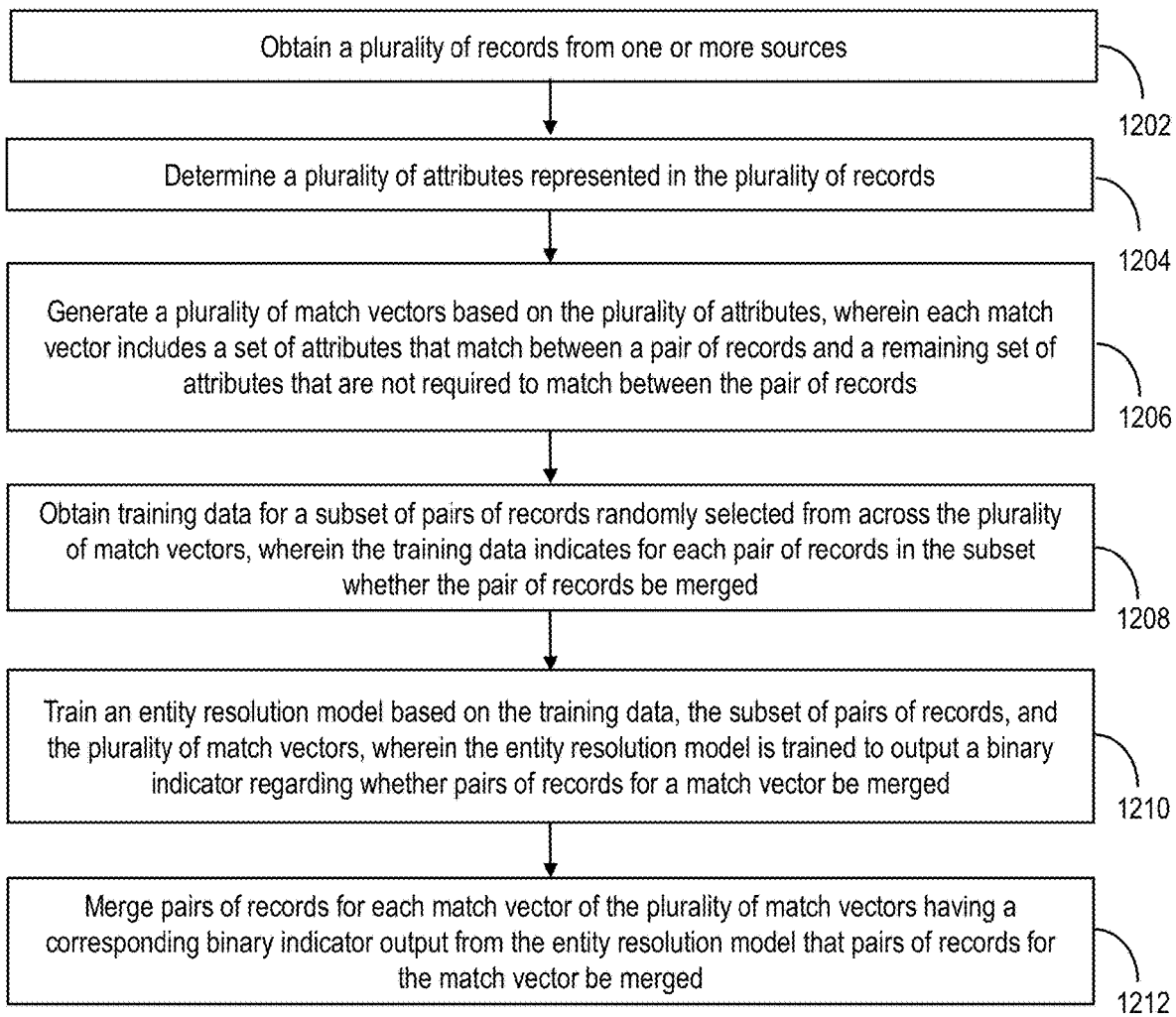
FIG. 12 shows a flowchart of the steps involved in performing entity resolution for a plurality of records, in accordance with one or more embodiments.

FIG. 12 shows a flowchart of the steps involved in performing entity resolution for a plurality of records, in accordance with one or more embodiments. For example, process 1200 may represent the steps taken by one or more devices discussed in relation to FIGS. 1-11. In some embodiments, process 1200 may be executed independent of a blocking key for performing entity resolution for the plurality of records.

At step 1202, process 1200 (e.g., using one or more components in system 1100 (FIG. 11)) may obtain a plurality of records from one or more sources. For example, process 1200 may obtain a plurality of records from one or more sources as shown with respect to FIG. 1.

At step 1204, process 1200 may determine a plurality of attributes represented in the plurality of records. For example, process 1200 may determine a plurality of attributes represented in the plurality of records as shown with respect to FIG. 4.

At step 1206, process 1200 may generate a plurality of match vectors based on the plurality of attributes. Each match vector includes a set of attributes that match between a pair of records and a remaining set of attributes that are not required to match between the pair of records. For example, process 1200 may generate a plurality of match vectors based on the plurality of attributes as shown with respect to FIG. 4.

In some embodiments, for each match vector in the plurality of match vectors, process 1200 may determine a count for pairs of records from the plurality of records that satisfy the match vector (e.g., as shown with respect to FIG. 5). For example, determining the count for the pairs of records from the plurality of records that satisfy the match vector may include executing a series of self-join and group-by-count operations expressible in a structured query language. Further, process 1200 may determine a probability that the pairs of records satisfying the match vector be merged (e.g., as shown with respect to FIGS. 6 and 7).

At step 1208, process 1200 may obtain training data for a subset of pairs of records randomly selected from across the plurality of match vectors. The training data indicates for each pair of records in the subset whether the pair of records be merged.

At step 1210, process 1200 may train an entity resolution model based on the training data, the subset of pairs of records, and the plurality of match vectors. The entity resolution model is trained to output a binary indicator (e.g., as shown with respect to FIG. 8) regarding whether pairs of records for a match vector be merged. In some embodiments, training the entity resolution model may include fitting the determined counts to a binary mixture of multinomial distributions.

In some embodiments, process 1200 may obtain training data for a subset of pairs of records randomly selected from across the plurality of match vectors. The training data indicates for each pair of records in the subset whether the pair of records be merged. Further, process 1200 may train the entity resolution model based on the training data, the subset of pairs of records, and the plurality of match vectors. The entity resolution model may be trained to output a binary indicator (e.g., as shown with respect to FIG. 8) regarding whether pairs of records for a match vector be merged. For example, the entity resolution model may include an inferred Bayesian prior computed based on the training data for the subset of pairs of records randomly selected from across the plurality of match vectors.

In some embodiments, process 1200 may obtain training data for pairs of records for the plurality of match vectors. The training data indicates whether the pair of records be merged and is computed based on a prior target. Further, process 1200 may train an entity resolution model based on the training data and the pairs of records for the plurality of match vectors. The entity resolution model may be trained to output a binary indicator (e.g., as shown with respect to FIG. 8) regarding whether pairs of records for a match vector be merged. For example, the entity resolution model may include a decision tree model, an XGBoost model, or a classification model.

At step 1212, process 1200 may merge pairs of records for each match vector of the plurality of match vectors having a corresponding binary indicator output (e.g., as shown with respect to FIG. 8) from the entity resolution model that pairs of records for the match vector be merged.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-11 could be used to perform one or more of the steps in FIG. 12.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for performing entity resolution for a plurality of records will be better understood with reference to the following enumerated embodiments:

1. A method for performing entity resolution for a plurality of records, the method comprising: obtaining a plurality of records from one or more sources; determining a plurality of attributes represented in the plurality of records; generating a plurality of match vectors based on the plurality of attributes, wherein each match vector includes a set of attributes that match between a pair of records and a remaining set of attributes that are not required to match between the pair of records; obtaining training data for a subset of pairs of records randomly selected from across the plurality of match vectors, wherein the training data indicates for each pair of records in the subset whether the pair of records be merged; training an entity resolution model based on the training data, the subset of pairs of records, and the plurality of match vectors, wherein the entity resolution model is trained to output a binary indicator regarding whether pairs of records for a match vector be merged; and merging pairs of records for each match vector of the plurality of match vectors having a corresponding binary indicator output from the entity resolution model that pairs of records for the match vector be merged.

2. A method for performing entity resolution for a plurality of records, the method comprising: obtaining a plurality of attributes represented in a plurality of records from one or more sources; generating a plurality of match vectors based on the plurality of attributes, wherein each match vector includes a set of attributes that match between a pair of records and a remaining set of attributes that are not required to match between the pair of records; processing the plurality of match vectors using an entity resolution model trained to output a binary indicator regarding whether one or more pairs of records for a match vector be merged; and merging the one or more pairs of records for each match vector of the plurality of match vectors having a corresponding binary indicator output from the entity resolution model that pairs of records for the match vector be merged.

3. A method, the method comprising: obtaining a plurality of attributes represented in a plurality of records from one or more sources; generating a plurality of match vectors based on the plurality of attributes, wherein each match vector includes a set of attributes that match between a pair of records and a remaining set of attributes that are not required to match between the pair of records; obtaining training data for pairs of records selected from across the plurality of match vectors, wherein the training data indicates for each pair of records whether the pair of records be merged; and training an entity resolution model based on the training data, the pairs of records, and the plurality of match vectors, wherein the entity resolution model is trained to output a binary indicator regarding whether one or more pairs of records for a match vector be merged.

4. The method of any one of the preceding embodiments, further comprising: for each match vector in the plurality of match vectors: determining a count for pairs of records from the plurality of records that satisfy the match vector; and determining a probability that the pairs of records satisfying the match vector be merged.

5. The method of any one of the preceding embodiments, wherein determining the count for the pairs of records from the plurality of records that satisfy the match vector comprises executing a series of self-join and group-by-count operations expressible in a structured query language.

6. The method of any one of the preceding embodiments, wherein training the entity resolution model comprises fitting the determined counts to a binary mixture of multinomial distributions.

7. The method of any one of the preceding embodiments, further comprising: obtaining training data for a subset of pairs of records randomly selected from across the plurality of match vectors, wherein the training data indicates for each pair of records in the subset whether the pair of records be merged; and training the entity resolution model based on the training data, the subset of pairs of records, and the plurality of match vectors, wherein the entity resolution model is trained to output a binary indicator regarding whether pairs of records for a match vector be merged.

8. The method of any one of the preceding embodiments, wherein the entity resolution model comprises an inferred Bayesian prior computed based on the training data for the subset of pairs of records randomly selected from across the plurality of match vectors.

9. The method of any one of the preceding embodiments, further comprising: obtaining training data for pairs of records for the plurality of match vectors, wherein the training data indicates whether the pair of records be merged and is computed based on a prior target; and training an entity resolution model based on the training data and the pairs of records for the plurality of match vectors, wherein the entity resolution model is trained to output a binary indicator regarding whether pairs of records for a match vector be merged.

10. The method of any one of the preceding embodiments, wherein the entity resolution model comprises a decision tree model, an XGBoost model, or a classification model.

11. The method of any one of the preceding embodiments, wherein the method is executed independent of a blocking key for performing entity resolution for the plurality of records.

12. The method of any one of the preceding embodiments, further comprising: merging the one or more pairs of records for each match vector of the plurality of match vectors having a corresponding binary indicator output from the entity resolution model that pairs of records for the match vector be merged.

13. The method of any one of the preceding embodiments, wherein obtaining training data for pairs of records selected from across the plurality of match vectors comprises obtaining training data for a subset of pairs of records randomly selected from across the plurality of match vectors, wherein the training data indicates for each pair of records in the subset whether the pair of records be merged.

14. The method of any one of the preceding embodiments, wherein obtaining training data for pairs of records selected from across the plurality of match vectors comprises obtaining training data for a subset of pairs of records randomly selected from across the plurality of match vectors, wherein the training data indicates for each pair of records in the subset whether the pair of records be merged.

15. A non-transitory, computer-readable medium storing instructions that, when executed by a data processing apparatus, cause the data processing apparatus to perform operations comprising those of any of embodiments 1-14.

16. A system comprising: one or more processors; and memory storing instructions that, when executed by the processors, cause the processors to effectuate operations comprising those of any of embodiments 1-14.

17. A system comprising means for performing any of embodiments 1-14.

What is claimed is:

1. A system for performing entity resolution for a plurality of records, the system comprising:
one or more processors; and
a non-transitory, computer-readable medium comprising instructions that, when executed by the one or more processors, cause operations comprising:
obtaining the plurality of records from one or more sources;
determining a plurality of attributes represented in the plurality of records;
generating a plurality of match vectors based on the plurality of attributes, wherein each match vector includes a set of attributes that match between a pair of records and a remaining set of attributes that are not required to match between the pair of records;
obtaining training data for a subset of pairs of records randomly selected from across the plurality of match vectors, wherein the training data indicates for each pair of records in the subset of pairs whether the pair of records be merged;
training an entity resolution model based on the training data and independent of a blocking key, the subset of pairs of records, and the plurality of match vectors;
determining, for each match vector in the plurality of match vectors, respective pairs of records from the plurality of records that satisfy a respective match vector, wherein the entity resolution model is trained to output a binary indicator regarding whether the respective pairs of records that satisfy the respective match vector be merged; and merging the respective pairs of records based on the respective pairs of records satisfying the respective match vector and based on a corresponding binary indicator output from the entity resolution model indicating that the respective pairs of records for the respective match vector be merged.

2. The system of claim 1, the operations further comprising:
for each match vector in the plurality of match vectors:
determining a count for pairs of records from the plurality of records that satisfy the respective match vector; and
determining a probability that the pairs of records satisfying the respective match vector be merged.

3. A method for performing entity resolution for a plurality of records, the method comprising:
obtaining a plurality of attributes represented in the plurality of records from one or more sources;
generating a plurality of match vectors based on the plurality of attributes, wherein each match vector includes a set of attributes that match between a pair of records and a remaining set of attributes that are not required to match between the pair of records;
processing, independent of a blocking key, the plurality of match vectors using an entity resolution model trained to output a binary indicator regarding whether one or more pairs of records for a match vector be merged;
determining, for each match vector in the plurality of match vectors, respective pairs of records from the plurality of records that satisfy a respective match vector; and
merging the respective pairs of records based on the respective pairs of records satisfying the respective match vector and based on a corresponding binary indicator output from the entity resolution model indicating that the respective pairs of records for the respective match vector be merged.

4. The method of claim 3, further comprising:
for each match vector in the plurality of match vectors:
determining a count for pairs of records from the plurality of records that satisfy the match vector; and
determining a probability that the pairs of records satisfying the match vector be merged.

5. The method of claim 4, wherein determining the count for the pairs of records from the plurality of records that satisfy the match vector comprises executing a series of self-join and group-by-count operations expressible in a structured query language.

6. The method of claim 4, wherein training the entity resolution model comprises fitting the determined counts to a binary mixture of multinomial distributions.

7. The method of claim 3, further comprising:
obtaining training data for a subset of pairs of records randomly selected from across the plurality of match vectors, wherein the training data indicates for each pair of records in the subset of pairs whether the pair of records be merged; and
training the entity resolution model based on the training data, the subset of pairs of records, and the plurality of match vectors, wherein the entity resolution model is trained to output the binary indicator regarding whether pairs of records for the respective match vector be merged.

8. The method of claim 7, wherein the entity resolution model comprises an inferred Bayesian prior computed based on the training data for the subset of pairs of records randomly selected from across the plurality of match vectors.

9. The method of claim 3, further comprising:
obtaining training data for pairs of records for the plurality of match vectors, wherein the training data indicates whether the pair of records be merged and is computed based on a prior target; and
training the entity resolution model based on the training data and the pairs of records for the plurality of match vectors.

10. The method of claim 9, wherein the entity resolution model comprises a decision tree model, an XGBoost model, or a classification model.

11. The method of claim 3, wherein the method is executed independent of the blocking key.

12. A non-transitory, computer-readable medium comprising instructions that, when executed by one or more processors, cause operations comprising:
obtaining a plurality of attributes represented in a plurality of records from one or more sources;
generating a plurality of match vectors based on the plurality of attributes, wherein each match vector includes a set of attributes that match between a pair of records and a remaining set of attributes that are not required to match between the pair of records;
obtaining training data for pairs of records selected from across the plurality of match vectors, wherein the training data indicates for each pair of records whether the pair of records be merged;
training an entity resolution model, that is independent of a blocking key, based on the training data, the pairs of records, and the plurality of match vectors; and
determining, for each match vector in the plurality of match vectors, respective pairs of records from the plurality of records that satisfy a respective match vector, wherein the entity resolution model is trained to output a binary indicator regarding the respective pairs of records that satisfy the respective match vector be merged.

13. The non-transitory, computer-readable medium of claim 12, further comprising:
merging the respective pairs of records for each match vector of the plurality of match vectors having a corresponding binary indicator output from the entity resolution model that the respective pairs of records that satisfy the respective match vector be merged.

14. The non-transitory, computer-readable medium of claim 12, further comprising:
for each match vector in the plurality of match vectors:
determining a count for pairs of records from the plurality of records that satisfy the respective match vector; and
determining a probability that the pairs of records satisfying the respective match vector be merged.

15. The non-transitory, computer-readable medium of claim 14, wherein determining the count for the pairs of records from the plurality of records that satisfy the respective match vector comprises executing a series of self-join and group-by-count operations expressible in a structured query language.

16. The non-transitory, computer-readable medium of claim 14, wherein training the entity resolution model comprises fitting the determined counts to a binary mixture of multinomial distributions.

17. The non-transitory, computer-readable medium of claim 12, wherein obtaining the training data for the pairs of records selected from across the plurality of match vectors comprises obtaining the training data for a subset of the pairs of records randomly selected from across the plurality of match vectors, wherein the training data indicates for each pair of records in the subset of the pairs whether the pair of records be merged.

18. The non-transitory, computer-readable medium of claim 17, wherein the entity resolution model comprises an inferred Bayesian prior computed based on the training data for the subset of the pairs of records randomly selected from across the plurality of match vectors.

19. The non-transitory, computer-readable medium of claim 12, wherein obtaining the training data for the pairs of records selected from across the plurality of match vectors comprises obtaining the training data for the pairs of records for the plurality of match vectors, wherein the training data indicates whether the pair of records be merged and is computed based on a prior target.

20. The non-transitory, computer-readable medium of claim 19, wherein the entity resolution model comprises a decision tree model, an XGBoost model, or a classification model.

\* \* \* \* \*